(12) United States Patent
Hashish

(10) Patent No.: US 12,226,810 B2
(45) Date of Patent: Feb. 18, 2025

(54) SYSTEMS AND METHODS USING WATERJETS FOR FINISHING MANUFACTURED ARTICLES

(71) Applicant: Flow International Corporation, Kent, WA (US)

(72) Inventor: Mohamed Hashish, Bellevue, WA (US)

(73) Assignee: Flow International Corporation, Kent, WA (US)

(\*) Notice: Subject to any disclaimer, the term of this patent is extended or adjusted under 35 U.S.C. 154(b) by 618 days.

(21) Appl. No.: 17/026,004

(22) Filed: Sep. 18, 2020

(65) Prior Publication Data

US 2021/0078051 A1 Mar. 18, 2021

Related U.S. Application Data

(60) Provisional application No. 62/902,287, filed on Sep. 18, 2019.

(51) Int. Cl.
*B08B 3/10* (2006.01)
*B24C 1/08* (2006.01)
*B24C 9/00* (2006.01)

(52) U.S. Cl.
CPC ............... *B08B 3/102* (2013.01); *B24C 1/08* (2013.01); *B24C 9/00* (2013.01)

(58) Field of Classification Search
CPC . B26F 3/004; B26F 3/008; B24C 3/18; B24C 7/0007; B24C 7/0015; B24C 7/0023; B24C 7/0084; B24C 1/045; B24C 1/08; B24C 9/00; B08B 3/102
See application file for complete search history.

(56) References Cited

U.S. PATENT DOCUMENTS

| | | | | |
|---|---|---|---|---|
| 6,766,216 | B2* | 7/2004 | Erichsen | B24C 1/045 83/72 |
| 7,052,378 | B2* | 5/2006 | Tateiwa | B24C 9/00 451/87 |
| 2008/0142050 | A1* | 6/2008 | Hashish | B24C 3/325 134/22.12 |
| 2012/0184185 | A1* | 7/2012 | Kanazawa | B26F 3/008 451/38 |
| 2015/0118942 | A1* | 4/2015 | Hashish | B24C 3/18 451/87 |
| 2017/0136650 | A1* | 5/2017 | Hashish | B24C 3/06 |

FOREIGN PATENT DOCUMENTS

JP    4169239 B2 * 10/2008

\* cited by examiner

*Primary Examiner* — Joel D Crandall
(74) *Attorney, Agent, or Firm* — Cozen O'Connor

(57) ABSTRACT

Disclosed herein are components, systems, and methods for performing a finishing operation on an article. Finishing operations include, but are not limited to removal of powder from a surface, improving surface finish, and peening. Embodiments of the disclosed components, systems, and methods include the use of waterjets to impact a surface of the article with an abrasive. Impacting the surface of the article with the abrasive alters a characteristic of the article without cutting through the portion of the article.

30 Claims, 3 Drawing Sheets

SYSTEMS AND METHODS USING WATERJETS FOR FINISHING MANUFACTURED ARTICLES

CROSS REFERENCE TO RELATED APPLICATION

This application claims the benefit of Provisional Application No. 62/902,287, filed Sep. 18, 2019, the disclosure of which is hereby incorporated by reference herein.

BACKGROUND

Technical Field

This disclosure relates to systems and methods that employ a waterjet to finish manufactured articles, and more particularly, to the use of one or more waterjets directed into a receptacle enclosing a volume of liquid to treat one or more surfaces of a workpiece submerged in the receptacle of liquid.

Description of the Related Art

Additive manufacturing produces articles by sintering micro or nano size particles, for example either by using a flat powder bed or powder flow, and a source of sintering heat, such as a laser. Additive manufacturing enables the production of complex articles with features that were unobtainable using previous manufacturing techniques. However, due to the granular nature of the additive manufacturing process, the articles produced may require one or more types of finishing. Finishing can include, but is not limited to, removal of powder from a surface, improving surface finish, and peening.

Due to the complex shape of some articles produced by additive manufacturing, many surfaces of those articles may be inaccessible to a conventional finishing tool. Thus, a need exists for systems and methods that enable finishing of an article with complex surfaces, for example an article produced by an additive manufacturing process.

BRIEF SUMMARY

Embodiments described herein provide systems and methods of finishing manufactured articles.

According to one embodiment, a system that performs a finishing operation on an article includes a receptacle, a tubular member, and a waterjet assembly. The receptacle at least partially encloses a fluid. The tubular member is positioned within the receptacle such that the tubular member is at least partially submerged within the fluid. The tubular member defines an interior space, an entry opening providing access for the fluid into the interior space, and an exit opening providing access from the interior space. The waterjet assembly outputs a high velocity jet of water, and the waterjet assembly is positioned such that the high velocity jet of water is output along a path that passes through at least a portion of the interior space and then exits through the exit opening. The entry opening is positioned relative to the exit opening such that as the high velocity jet of water passes through at least a portion of the interior space and then exits through the exit opening, a portion of the fluid is drawn through the entry opening and into the interior space.

Additional embodiments described herein provide a method of performing a finishing operation on an article includes submerging a portion of the article in a fluid, producing a high velocity jet of water that is output along a path that intersects the portion of the article in the fluid, and impacting the portion of the article with a slurry, the slurry including the high velocity jet of water and an abrasive material, thereby altering a characteristic of the portion of the article without cutting through the portion of the article.

Additional embodiments described herein provide a system that performs a finishing operation on an article, the system includes a receptacle, a first waterjet assembly, and a second waterjet assembly. The receptacle at least partially encloses a fluid. The first waterjet assembly outputs a first high velocity jet of water, and the first waterjet assembly is submerged within the fluid such that the first high velocity jet of water is output along a first path. The second waterjet assembly outputs a second high velocity jet of water, and the second waterjet assembly is submerged within the fluid such that the second high velocity jet of water is output along a second path. The first waterjet assembly and the second waterjet assembly are positioned such that, upon activation, the first high velocity jet of water and the second high velocity jet of water form a current in the fluid that rotates about an axis of rotation.

Additional embodiments described herein provide a method of performing a finishing operation on an article, the method including submerging a portion of the article in a fluid, forming a current in the fluid that rotates about an axis of rotation, and impacting a surface of the article with an abrasive material, wherein the abrasive material is moved relative to the article by the current, and wherein impacting the surface includes altering a characteristic of the portion of the article without cutting through the portion of the article.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
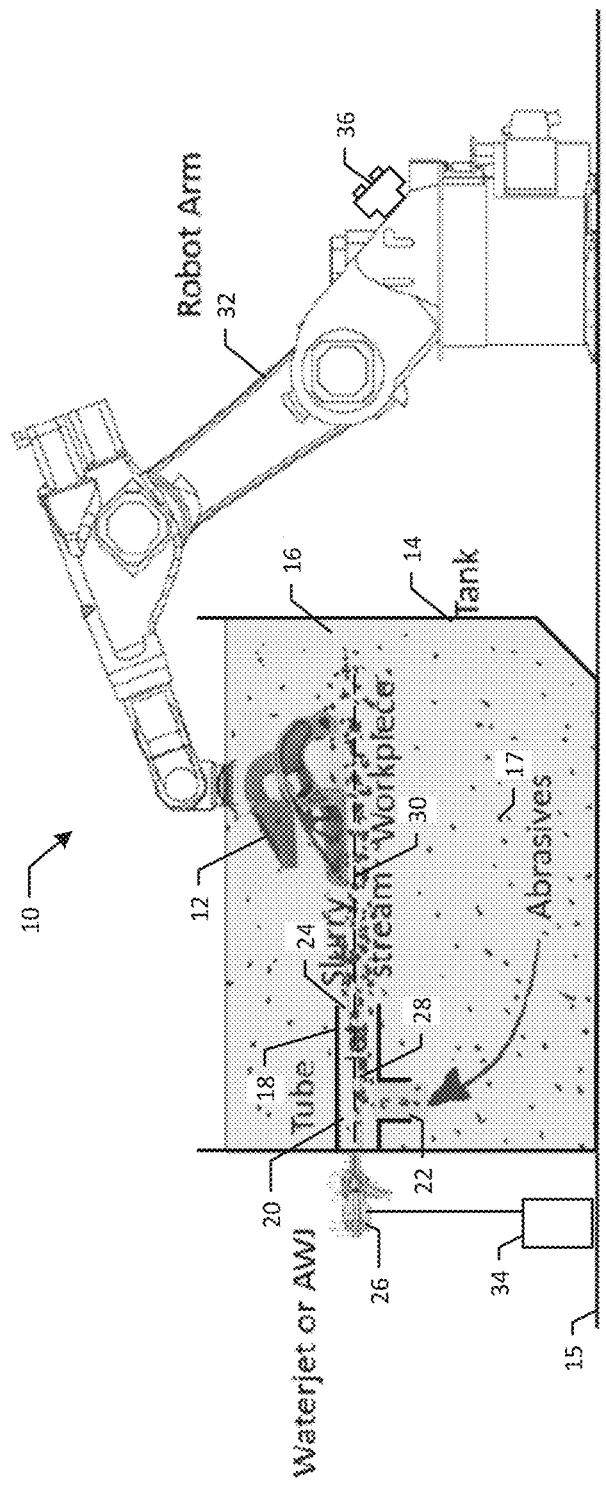
FIG. 1 is a side, elevation view of a system that performs a finishing operation on an article, according to one embodiment.

In the following description, certain specific details are set forth to provide a thorough understanding of various disclosed embodiments. However, one skilled in the relevant art will recognize that embodiments may be practiced without one or more of these specific details, or with other methods, components, materials, etc. In other instances, well-known structures associated with high pressure waterjet systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For example, certain features of the disclosure which are described herein in the context of separate embodiments may also be provided in combination in a single embodiment. Conversely, various features of the disclosure that are described in the context of a single embodiment may also be provided separately or in any subcombination.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. Reference herein to two elements "facing" or "facing toward" each other indicates that a straight line can be drawn from one of the elements to the other of the elements without contacting an intervening solid structure.

The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure. The term "cutting through" a structure refers to a complete removal of material through an entire thickness of the structure along the direction of impact of the cutting apparatus, for example the direction of travel of a waterjet just before it strikes a surface of the workpiece.

The headings and Abstract of the Disclosure provided herein are for convenience only and do not interpret the scope or meaning of the embodiments.

Referring to FIG. 1, a system 10 can be used to perform a finishing operation (also referred to herein as "finishing") on an article 12. The article 12 can be a manufactured part, for example one produced by an additive manufacturing process, such as 3D printing. The system 10, according to one embodiment, is capable of performing one or more finishing operations on one or more of the articles 12, simultaneously. The one or more articles 12 can include a plurality of identical articles, or can include a plurality of different articles.

As shown in the illustrated embodiment, the system 10 can include a receptacle 14, for example a water tank, that at least partially encloses a fluid 16 of the system 10. For example, the receptacle 14 can include a base and side-walls and have an open top. According to another embodiment, the top of the receptacle 14 can be at least partially enclosed as well. As shown, the receptacle 14 can be supported by a surface 15, for example a floor.

The fluid 16 can be a pure fluid, for example water, devoid of any particulate material, such as an abrasive, prior to operation of the system 10. Alternatively, the fluid 16 can be a slurry that includes a mixture of a liquid, for example water, and an abrasive 17.

The system 10 can further include a tubular member 18 positioned within the receptacle 14 such that the tubular member 18 is at least partially submerged within the fluid 16. As shown, the tubular member 18 can define an interior space 20, an entry opening 22 providing access for the fluid into the interior space 20, and an exit opening 24 providing access from the interior space 20.

The system 10 can include a waterjet assembly 26 that outputs a high velocity jet 28. The high velocity jet 28 can be a pure water jet, such that the jet is devoid of abrasives added prior to the jet being output from the waterjet assembly 26. According to one embodiment the high velocity jet 28 can be an abrasive jet, including a fluid, for example water, laden with abrasive material such as the abrasive 17, prior to output from the waterjet assembly 26. The high velocity jet 28 can be output at a pressure of at least 90,000 psi. According to another embodiment, the high velocity jet 28 can be output at a pressure of at least 40,000 psi. According to another embodiment, the high velocity jet 28 can be output at a pressure of at least 20,000 psi.

As shown in the illustrated embodiment, the waterjet assembly 26 can be positioned such that the high velocity jet 28 is output along a path 30 that passes through at least a portion of the interior space 20 and then exits through the exit opening 24. According to one embodiment, the path 30 is parallel to the surface 15. According to another embodiment, the path 30 is non-parallel, for example perpendicular to the surface 15.

The entry opening 22 can be positioned relative to the exit opening 24 such that as the high velocity jet 28 passes through at least a portion of the interior space 20 and then exits through the exit opening 24, a portion of the fluid 16 is drawn through the entry opening 22 (as shown by the arrow) and into the interior space 20. As shown, the entry opening 22 can be angularly offset, for example perpendicular, to the exit opening 24. According to one embodiment, the entry opening 22 can be angularly parallel to the exit opening 24.

The abrasive 17, whether part of the fluid 16 in the receptacle 14, or part of the high velocity jet 28, can have round edges, sharp edges, or can be a mixture that includes some particles with round edges and some particles with sharp edges. The abrasive 17 can include particles with a size of 80 mesh, 120 mesh, 240 mesh, 400 mesh, or any combination thereof. The abrasive 17 can include garnet, aluminum oxide, silicon carbide, steel grit, glass beads, or any combination thereof.

According to one embodiment, the system 10 can include multiple types (for example different size, shape, or material) of the abrasive 17. The system 10 can include a controller to facilitate substitution of one type of the abrasive 17 for another type of the abrasive 17. For example, the system 10 may include a first abrasive 17 configured for use in a first finishing operation, such as powder removal, and further include a second abrasive 17 configured for use in a second finishing operation, such as peening.

The system 10 can include a support structure 32 positioned to support the article 12 within the receptacle 14 such that the article 12 is at least partially submerged in the fluid 16. According to one embodiment, the support structure 32 is positioned to support the article 12 such that the path 30 intersects a surface of the article 12. The support structure 32 can be movable such that an angle at which the path 30 intersects the surface of the article 12 is adjustable. According to one embodiment, the angle is adjustable between 0 degrees and 90 degrees. According to one embodiment, the angle is adjustable between 0 degrees and 180 degrees.

The support structure 32 can be movable such that the support structure 32 is able to manipulate, for example translate, rotate, or both, the article 12 such that the path 30 intersects a first surface of the article 12 when the support structure 32 is in a first orientation and intersects a second surface of the article 12 when the support structure 32 is in a second orientation. According to one embodiment, in the second configuration the path 30 does not intersect the first surface of the article 12.

The support structure 32 can be movable such that the article 12, while supported by the support structure 32, is movable in up to six degrees of freedom. As shown in the illustrated embodiment, the support structure 32 can include a robotic arm.

The system 10 can include a plurality of waterjet assemblies. For example, the system 10 can include a second waterjet assembly (not shown) that outputs a second high velocity jet of water. The second waterjet assembly can be positioned such that the second high velocity jet of water is output along a second path that passes through the fluid 16. The second waterjet assembly can be positioned such that the second path is collinear with the first path. According to one embodiment the second waterjet assembly can be positioned such that the second path is parallel and offset with respect to the first path. According to one embodiment the second waterjet assembly can be positioned such that the second path is perpendicular to the first path. The system 10 can include a plurality of the tubular members 18, for example one of the tubular members 18 for each of the waterjet assemblies 26 of the system 10.

The system 10 can include a controller 34 capable of changing one or more settings of the system 10. The one or more settings can include, for example, velocity of the high velocity jet 28, pressure of the high velocity jet 28, position of the article 12 relative to the path 30, and angle at which the path 30 intersects the article 12. The controller 34 can include a plurality of configurations that each correlate to a specific value, for example a range of values, for each of one or more settings.

According to one embodiment, the system 10 can include an input assembly 36 that allows an end user to select one of the plurality of configurations to be the active configuration, thereby changing the specific value for each of the one or more settings to the respective values that correlate to the selected one of the plurality of configurations. For example, the input assembly 36 may include a first input that correlates to a powder removal finishing operation, and upon actuation of the first input the controller 34 adjusts the one or more settings, for example velocity of the high velocity jet 28, to correlate to the specific value for the powder removal finishing operation.

It will be understood by those skilled in the art that the changing of the one or more settings of the system 10 can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other nontransitory media.

According to one embodiment, the controller 34 includes at least one computer readable medium storing logic or information for the changing of the one or more settings of the system 10 as described herein.

Figure 2:
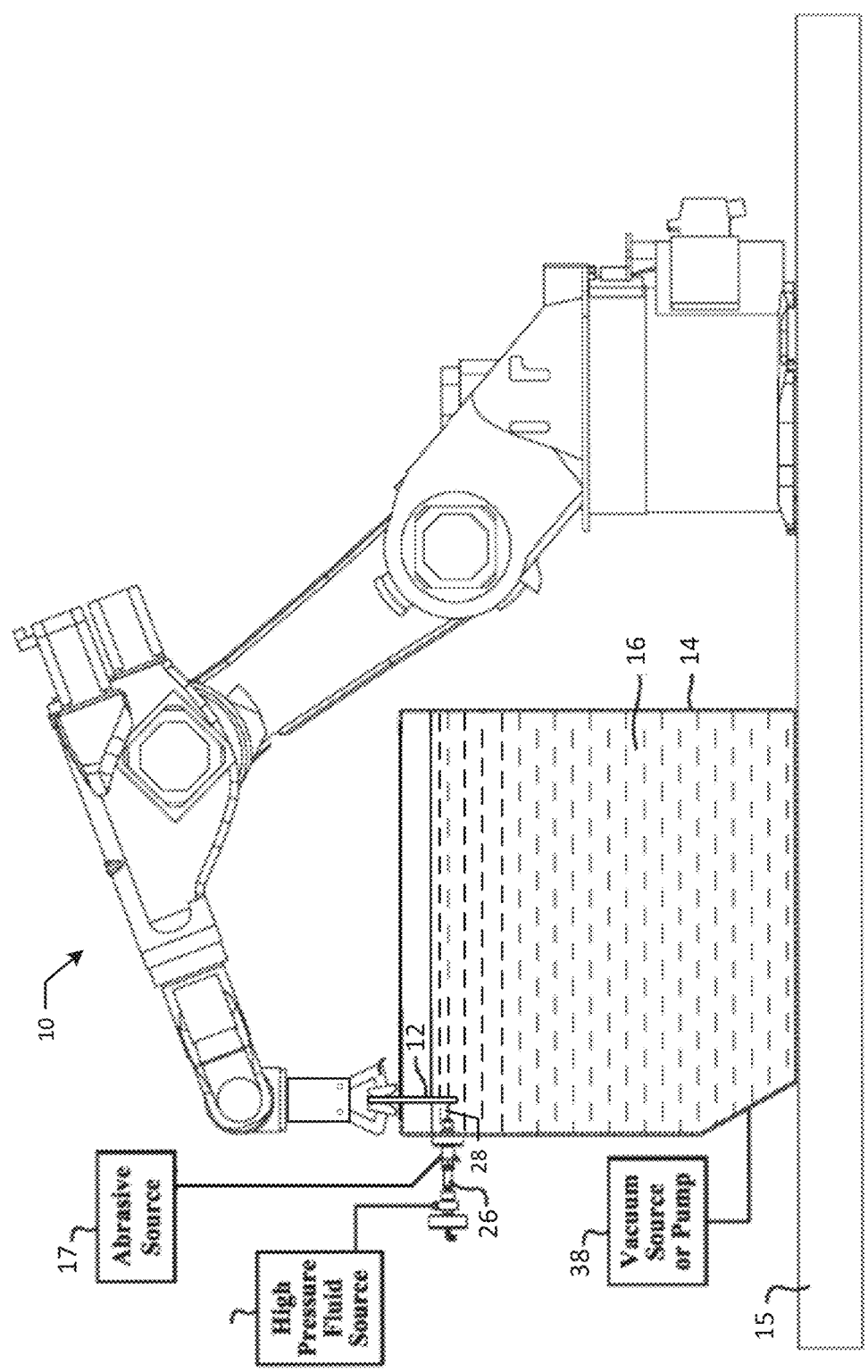
FIG. 2 is a side, elevation view of a system that performs a finishing operation on an article, according to another embodiment.

Referring to FIG. 2, an embodiment of the system 10 can be similar to the system 10 as described in FIG. 1, and can include any combination of the elements shown and described above in reference to FIG. 1. As shown, the system 10 can be devoid avoid the tubular member 18. The system 10 can include the waterjet assembly 26 which outputs the high velocity jet 28 laden with the abrasive 17. The system 10 can include an abrasive removal assembly 38 that removes the abrasive 17 from the receptacle 14. The abrasive removal assembly 38 can include a vacuum source or pump, and can recycle the abrasive 17 for re-use in a future finishing operation by the system 10.

Referring to FIGS. 1 and 2, a method of finishing the article 12 includes submerging a portion of the article 12, for example the entirety of the article 12, in the fluid 16 within the receptacle 14. The method can further include producing the high velocity jet 28, for example a high velocity jet of water produced by the waterjet assembly 26, and outputting the high velocity jet 28 along the path 30, which intersects the portion of the article 12 submerged in the fluid 16. The method can further include impacting the portion of the article 12 with a slurry thereby altering a characteristic of the portion of the article 12 without cutting through the portion of the article 12. For example, the slurry can dent, deform, erode, polish, etc., but does not cut completely through the thickness of the article 12 along the direction of impact of the slurry. The slurry can include the high velocity jet 28 and the abrasive 17.

The method can include positioning the waterjet assembly 26 such that a nozzle of the waterjet assembly 26 that outputs the high velocity jet 28 is submerged in the fluid 16.

As shown in FIG. 1, the method can include directing the high velocity jet 28 along the path 30 such that the high velocity jet 28 passes through at least a portion of the interior space 20 defined by the tubular member 18 submerged in the fluid 16, and then exits through the exit opening 24 defined by the tubular member 18 prior to impacting the portion of the article 12. The method can include drawing a portion of the fluid 16 through the entry opening 22 of the tubular member 18, and drawing the portion of the fluid 16 into the interior space 20. According to one embodiment, the fluid is drawn through the entry opening 22 as a result of movement of the high velocity jet 28 through the interior space 20.

Figure 3:
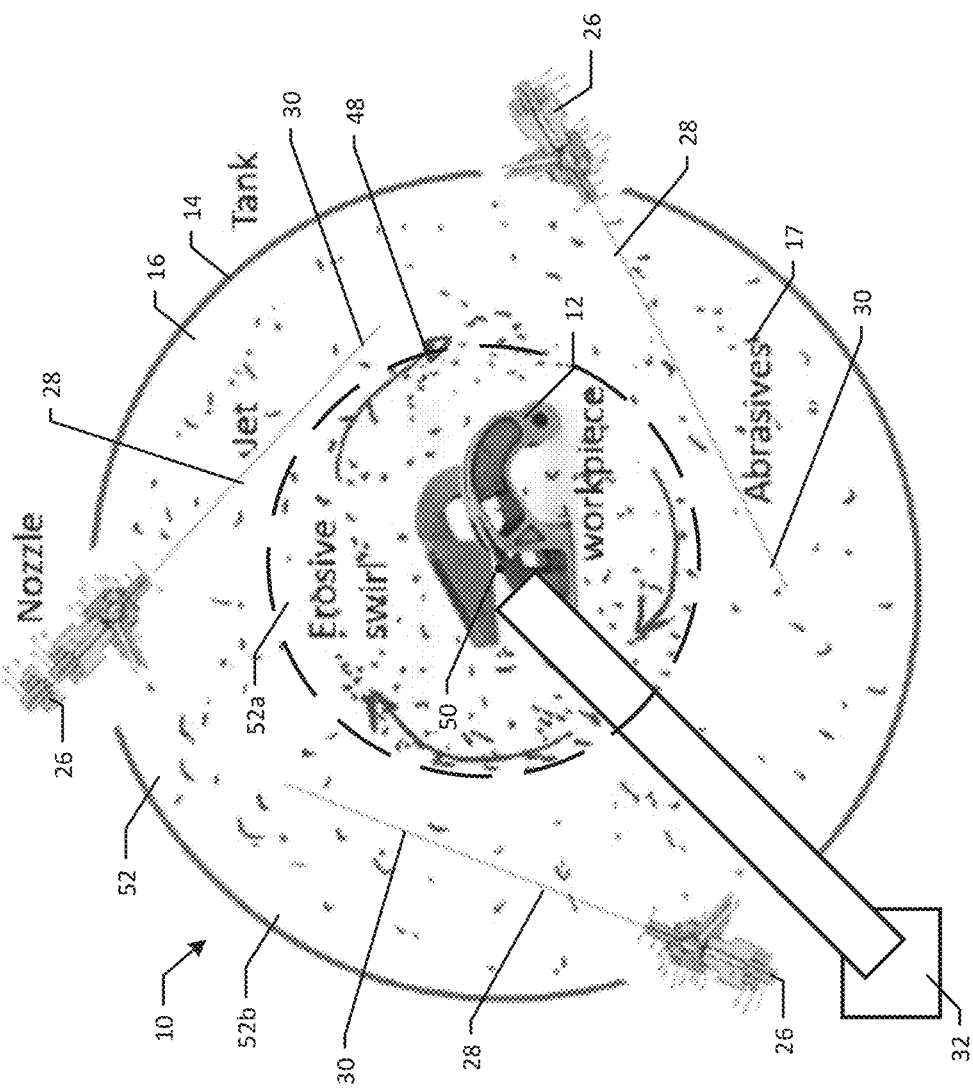
FIG. 3 is a top, plan view of a system that performs a finishing operation on an article, according to another embodiment.

Referring to FIG. 3, an embodiment of the system 10 can be similar to the system 10 as described in FIG. 1 and FIG. 2, and can include any combination of the elements shown and described above in reference to FIG. 1 and FIG. 2. As shown in the illustrated embodiment, the system 10 can include the receptacle 14 at least partially enclosing the fluid 16. The receptacle 14 can define a circular shape, as shown. The system 10 can include at least one of the waterjet assembly 26 that outputs the high velocity jet 28 along the path 30, which is submerged within the fluid 16. The at least one waterjet assembly 26 can be positioned such that, upon activation, the high velocity jet 28 forms a current 48 in the fluid 16 that rotates about an axis of rotation 50. As shown in the illustrated embodiment, the current 48 can be clockwise as viewed from above the receptacle 14.

The at least one waterjet assembly 26 can include a plurality of waterjet assemblies, for example first and second waterjet assemblies. Each of the plurality of waterjet assemblies outputs a respective high velocity jet 28, for example a high velocity jet of water, along a respective path 30. As shown, each of the respective paths 30 can be offset from one another. For example, the respective paths 30 can be coplanar and non-collinear. According to one embodiment, the respective paths 30 can be coplanar and non-parallel. According to one embodiment, the respective paths 30 can be defined within different planes, such that they are not coplanar. The plurality of waterjet assemblies can further include a third waterjet assembly. The plurality of waterjet assemblies can include additional waterjet assemblies.

The system 10 can include the support structure 32 positioned to support the article 12 within the receptacle 14 such that the article 12 is at least partially submerged in the fluid 16. As shown, the support structure 32 can position the article 12 such that the article 12 intersects the axis of rotation 50. According to one embodiment the support structure 32 can position the article 12 such that at least one of the respective paths 30, for example all of the respective paths 30, does not intersect the article 12. According to one embodiment the support structure 32 can position the article 12 such that at least one of the respective paths 30, for example all of the respective paths 30, intersects the article 12.

According to one embodiment, the system 10 current 48 defines zones 52 of different strengths within the fluid 16. The zones 52 of different strengths 52 can be based on speed of the current 48 within the respective zone 52, density of the abrasive 17 within the respective zone 52, or both.

The support structure 32 can be positioned to support the article 12 within the receptacle 14 such that the article 12 is movable between different ones of the zones 52 of different strengths. The zones 52 of different strengths can be arranged as concentric rings, for example, centered on the axis of rotation 52 as shown in the illustrated embodiment. The zones 52 of different strengths can include a first zone 52a and a second zone 52b, the first zone 52a positioned closer to the axis of rotation 50 than the second zone 52b is from the axis of rotation 50. According to one embodiment, the first zone 52a can include at least one of a faster current and a more concentrated amount of the abrasive 17.

A method of finishing the article 12 can include submerging a portion of the article 12 in the fluid 16, forming the current 48 in the fluid 16, for example such that the current 48 rotates about the axis of rotation 50, and impacting a surface of the article 12 with the abrasive 17. Impacting the surface of the article 12 includes altering a characteristic of the surface of the article 12 without cutting through the portion of the article 12. The abrasive 17 can be moved relative to the article 12 by the current 48.

Forming the current 48 can include producing the high velocity jet 28 submerged within the fluid 16, and directing the high velocity jet 28 along the path 30. As shown, the path 30 may not intersect the axis of rotation 50. Forming the current 48 can include producing a second high velocity jet 28 that is also submerged within the fluid 16. The method can further include directing the second high velocity jet 28 along a second path 30 that does not intersect the axis of rotation 50 and that is offset from the first path 30. The method can further include moving the article 12 from one of the zones 52 of different strengths, for example the first zone 52a, to another of the zones 52 of different strengths, for example the second zone 52b.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a receptacle containing a fluid media;
a water jet assembly that outputs a high velocity jet of water into the receptacle along a jet path;
an article at least partially submerged in the fluid media at a location within the receptacle that is offset from the jet path; and
a support structure supporting the article at the location when the high velocity jet of water agitates the fluid media and forms a level of turbulence within the fluid media sufficient for the fluid media to alter a characteristic of a surface of the article without the high velocity water jet directly impacting the article.

2. The system of claim 1 wherein the fluid media is an abrasive slurry.

3. The system of claim 1 wherein the high velocity jet of water is a first high velocity jet of water, the first high velocity jet of water is output in a first direction, the water jet assembly outputs a second high velocity jet of water into the receptacle thereby further agitating the fluid media, and the second high velocity jet of water is output in a second direction that is different than the first direction.

4. The system of claim 1 wherein the water jet assembly agitates the fluid media such that zones of different strengths of turbulence are formed, based on speed of the fluid media relative to the receptacle within the respective zone.

5. The system of claim 4, further comprising:
the support structure positioned to support the article within the receptacle such that the article is movable between different ones of the zones of different strengths.

6. A system to perform finishing of an article, the system comprising:
a receptacle containing a fluid;
a tubular member defining an interior space, an entry, and an exit, the tubular member positioned within the receptacle such that:
the tubular member is at least partially submerged within the fluid;
the entry provides access for the fluid into the interior space; and
the exit provides passage for the fluid out of the interior space; and
a waterjet assembly that outputs a high velocity jet of water, the waterjet assembly positioned such that the high velocity jet of water is output along a path that passes through at least a portion of the interior space and then exits through the exit,
wherein the entry is positioned relative to the exit such that as the high velocity jet of water passes through at least a portion of the interior space and then exits through the exit, a portion of the fluid is drawn through the entry, into the interior space, and exits through the exit.

7. The system of claim 6 wherein the fluid is a slurry that includes a mixture of a liquid and an abrasive material.

8. The system of claim 7 wherein the abrasive material has round edges, sharp edges, or both round edges and sharp edges.

9. The system of claim 7 wherein the abrasive material has a size of 80 mesh, 120 mesh, 240 mesh, 400 mesh, or any combination thereof.

10. The system of claim 7 wherein the abrasive material includes garnet, aluminum oxide, silicon carbide, steel grit, glass beads, or any combination thereof.

11. The system of claim 6 wherein the waterjet assembly outputs a high velocity jet of pure water.

12. The system of claim 6 wherein the waterjet assembly outputs a high velocity jet of water mixed with an abrasive material.

13. The system of claim 6 wherein the waterjet assembly outputs the high velocity jet of water at a pressure of at least 20,000 psi.

14. The system of claim 6, further comprising:
a support structure positioned to support the article within the receptacle such that the article is at least partially submerged in the fluid.

15. The system of claim 14 wherein the support structure is positioned to support the article such that the path intersects a surface of the article.

16. The system of claim 15 wherein the support structure is movable such that an angle at which the path intersects the surface of the article is adjustable.

17. The system of claim 14 wherein the support structure is movable such that the supported article is moveable in six degrees of freedom.

18. The system of claim 17 wherein the support structure includes a robotic arm.

19. The system of claim 6 wherein the waterjet assembly is a first waterjet assembly, the high velocity jet of water is a first high velocity jet of water, the path is a first path, and the system further comprises:
a second waterjet assembly that outputs a second high velocity jet of water, the second waterjet assembly positioned such that the second high velocity jet of water is output along a second path that passes through the fluid.

20. The system of claim 19 wherein the tubular member is a first tubular member, the interior space is a first interior space, the entry is a first entry, the exit is a first exit, and the system further comprises:
a second tubular member positioned within the receptacle such that the second tubular member is at least partially submerged within the fluid, the second tubular member defining a second interior space, a second entry providing access for the fluid into the second interior space, and a second exit providing passage for the fluid out of the second interior space.

21. The system of claim 6, further comprising:
a controller capable of changing one or more settings of the system.

22. The system of claim 21 wherein the one or more settings include: velocity of the high velocity jet of water, pressure of the high velocity jet of water, position of the article relative to the path, angle at which the path intersects the article, or any combination thereof.

23. The system of claim 22 wherein the controller includes a plurality of values for each of one or more settings.

24. A system to perform finishing of an article, the system comprising:
a receptacle containing a fluid;
a waterjet assembly that outputs a high velocity jet of water, the waterjet assembly positioned such that the high velocity jet of water is output along a path that is submerged in the fluid;
a tubular member defining an interior space, an entry, and an exit, wherein the tubular member is positioned within the receptacle such that the tubular member is at least partially submerged within the fluid; the entry provides access for the fluid into the interior space; and the exit provides passage for the fluid out of the interior space, and wherein the entry is positioned relative to the exit such that as the high velocity jet of water passes through at least a portion of the interior space and exits through the exit, a portion of the fluid is drawn through the entry and into the interior space;
an abrasive that mixes with the high velocity jet of water to form a slurry jet; and
a support structure positioned to support the article within the receptacle such that the article is at least partially submerged in the fluid,
wherein the support structure changes at least one of:
1) a distance from the waterjet assembly to the article, and
2) an orientation of the article relative to the waterjet assembly,
such that upon activation of the waterjet assembly, the slurry jet impacts the article and alters a characteristic of the article without cutting through the article.

25. A system to perform finishing of an article, the system comprising:
a receptacle with a circular shape containing a fluid;
a first waterjet assembly that outputs a first high velocity jet of water, the first waterjet assembly submerged within the fluid such that the first high velocity jet of water is output along a first path; and
a second waterjet assembly that outputs a second high velocity jet of water, the second waterjet assembly submerged within the fluid such that the second high velocity jet of water is output along a second path that is offset from the first path,
wherein the first waterjet assembly and the second waterjet assembly are positioned such that, upon activation, the first high velocity jet of water and the second high velocity jet of water form a current in the fluid that rotates about an axis of rotation at the center of the circular shape of the receptacle.

26. The system of claim 25, further comprising:
a support structure positioned to support the article within the receptacle such that the article is at least partially submerged in the fluid.

27. The system of claim 25 wherein the fluid is a slurry that includes a mixture of a liquid and an abrasive material.

28. The system of claim 25 wherein the waterjet assembly outputs a high velocity jet of water mixed with an abrasive material.

29. The system of claim 25 wherein the current defines zones of different strengths based, at least in part, on speed of the current within the respective zone.

30. The system of claim 29, further comprising:
a support structure positioned to support the article within the receptacle such that the article is movable between different ones of the zones of different strengths.

* * * * *